United States Patent [19]

McConnell

[11] 3,927,350
[45] Dec. 16, 1975

[54] SELF-SWITCHED INDUCTIVE FAULT CURRENT LIMITER

[75] Inventor: Lorne D. McConnell, Chalfont, Pa.

[73] Assignee: I-T-E Imperial Corporation, Spring House, Pa.

[22] Filed: Apr. 22, 1974

[21] Appl. No.: 462,781

[52] U.S. Cl............. 317/11 C; 317/11 E; 317/11 A; 317/11 R; 317/16; 200/144 AP
[51] Int. Cl.²........................................ H02H 7/22
[58] Field of Search...... 317/16, 18 R, 20, 53, 11 C, 317/11 E, 11 A, 11 R, 11 B, 11 D; 200/144 AP, 146 R; 307/135, 136; 323/76, 43.5

[56] References Cited
UNITED STATES PATENTS

| | | | |
|---|---|---|---|
| 1,755,111 | 4/1930 | Gay | 317/53 |
| 1,894,119 | 1/1933 | Pratt | 317/20 |
| 2,350,195 | 5/1944 | Rypinski | 317/20 |
| 2,374,974 | 5/1945 | Blume | 307/135 |
| 2,977,488 | 3/1961 | Walz et al. | 307/136 X |
| 3,192,338 | 6/1965 | Haynes | 317/20 X |
| 3,192,440 | 6/1965 | Baltensperger | 200/144 AP X |
| 3,219,883 | 11/1965 | Barkan | 317/20 X |
| 3,289,042 | 11/1966 | Bodenschatz | 317/20 X |
| 3,376,475 | 4/1968 | Greber | 317/11 B |
| 3,777,291 | 12/1973 | Kroon | 335/16 |
| 3,836,819 | 9/1974 | Clausing | 200/144 AP X |

Primary Examiner—J. D. Miller
Assistant Examiner—Patrick R. Salce
Attorney, Agent, or Firm—Ostrolenk, Faber, Gerb & Soffen

[57] ABSTRACT

A parallel-connected inductance and capacitor are connected in parallel with a normally closed switching device and in series with an electric power distribution system. The capacitive reactance of the capacitor is substantially higher than the inductive reactance of the inductor at the power line frequency. The normally closed switching device is opened in response to a predetermined level of fault current in the system so that the reactor is inserted into the power distribution system to effect limitation of current level. The switching device is spring-biased to a closed position and the current path through the switch contacts forms a blow-open magnetic circuit, whereby the contacts are blown open against the closing force of the biasing springs when the predetermined current magnitude is reached. Means are provided to produce a high arcing voltage in a pressurized liquid medium.

7 Claims, 11 Drawing Figures

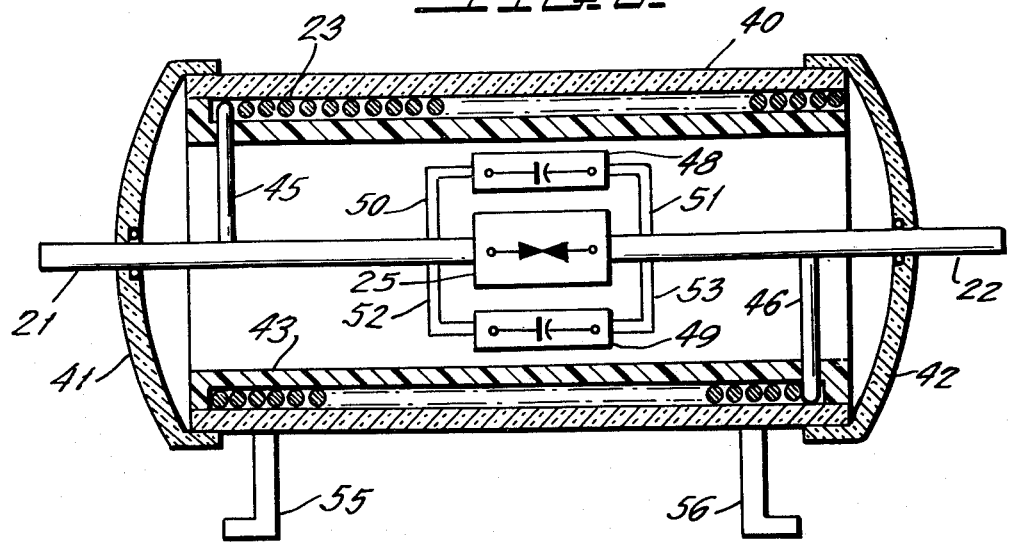
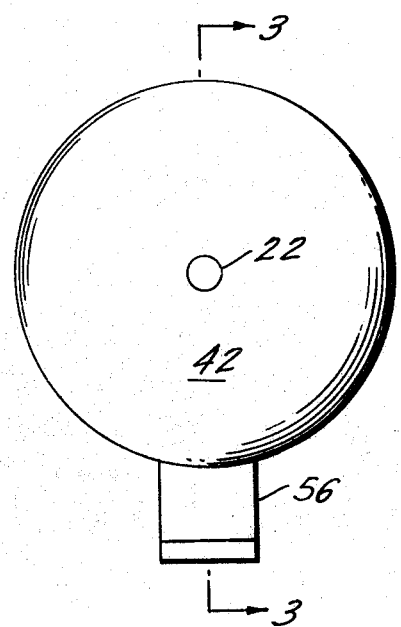

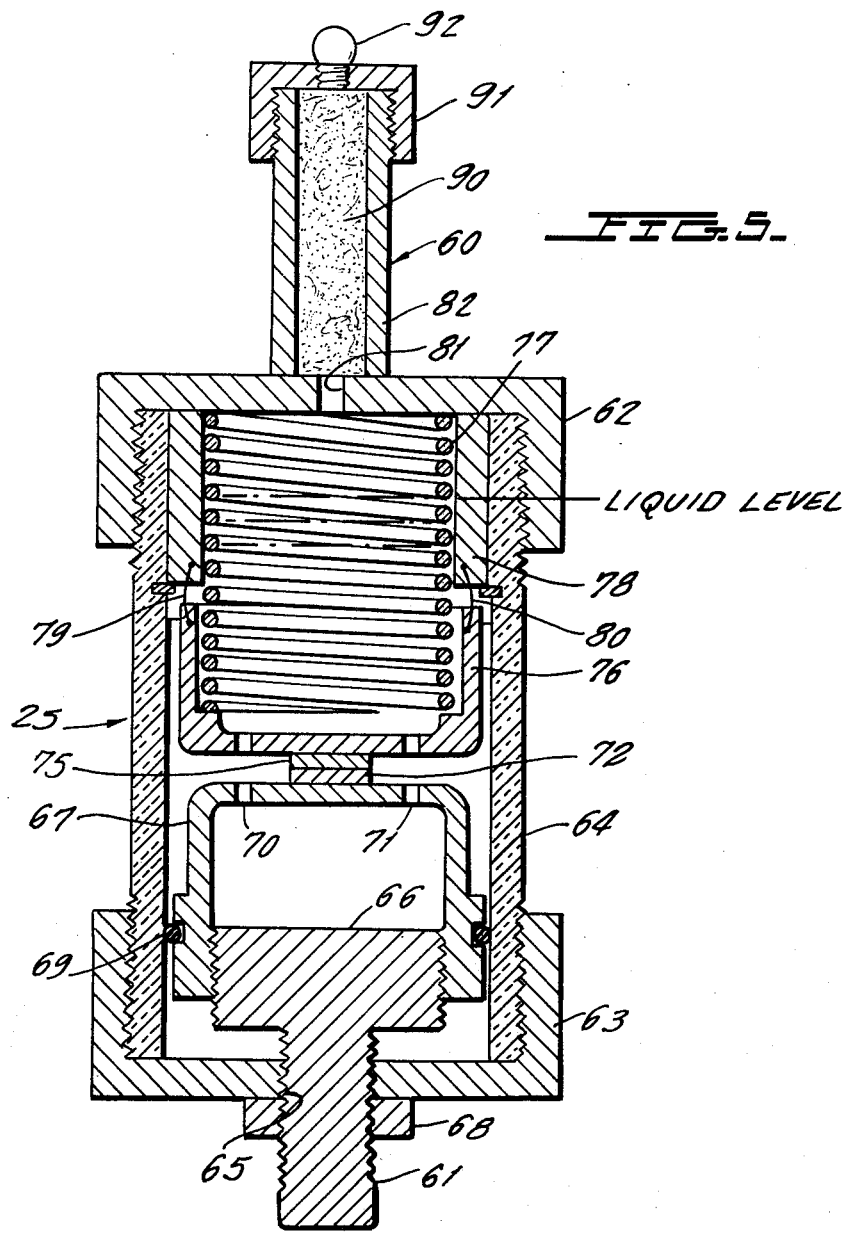
_FIG.5_
LIQUID LEVEL
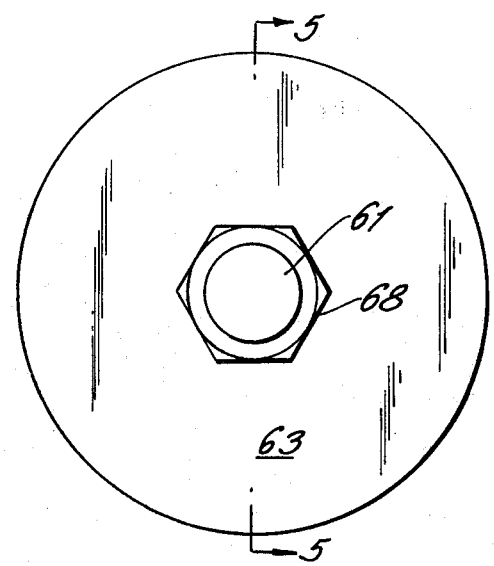
_FIG.4_

SF₆ LIQUID LEVEL

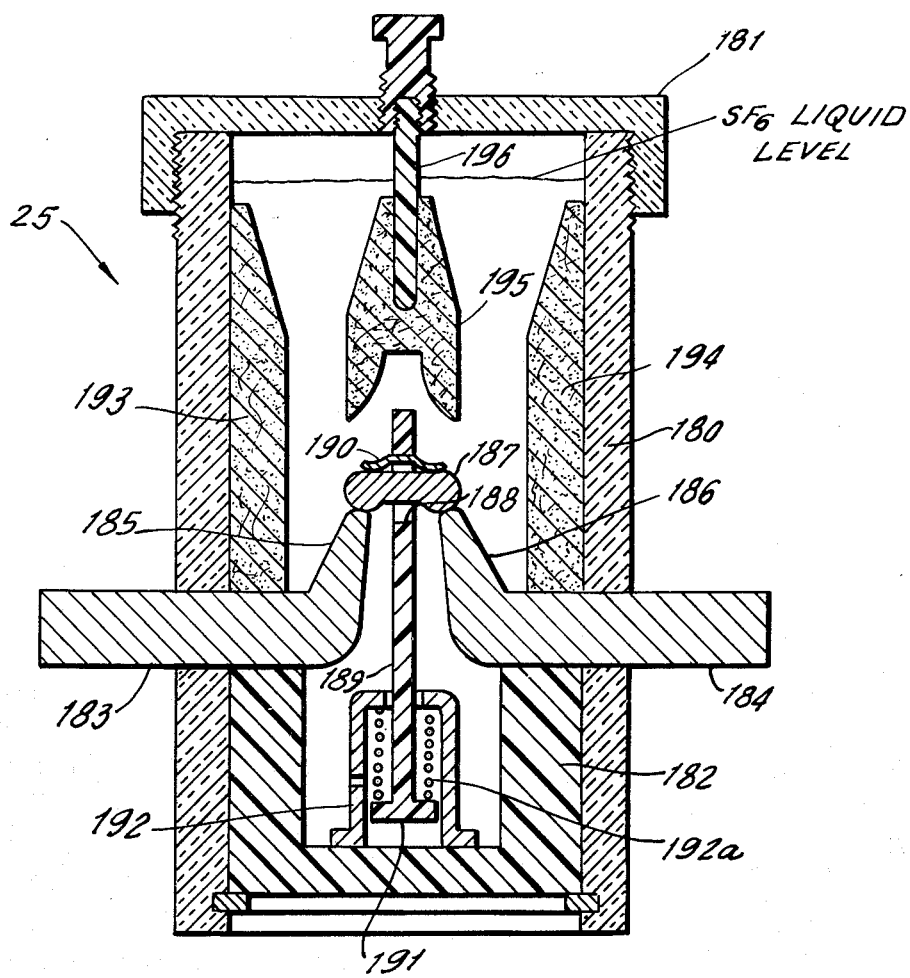
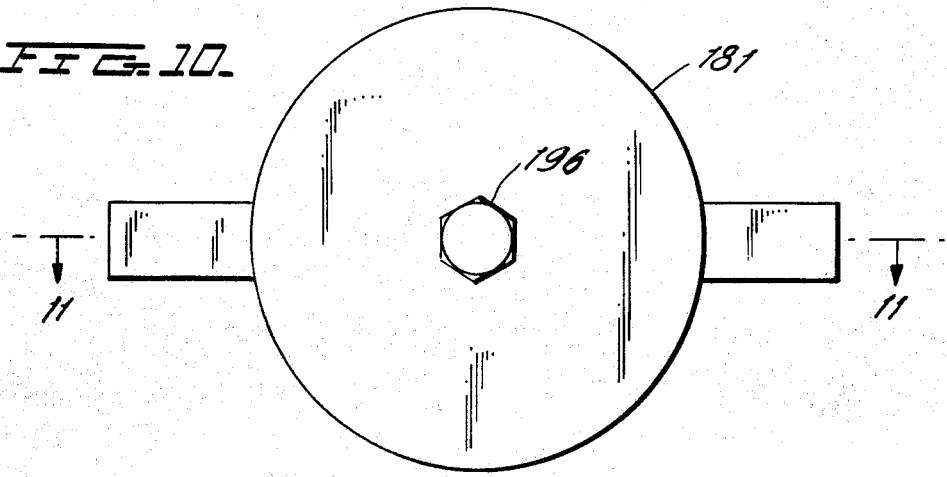

3,927,350

SELF-SWITCHED INDUCTIVE FAULT CURRENT LIMITER

RELATED APPLICATIONS

This application is related to my copending U.S. application Ser. No. 462,987, filed Apr. 22, 1974, entitled SELF-OPERATING FAULT CURRENT LIMITER SWITCH, and assigned to the assignee of the present invention.

BACKGROUND OF THE INVENTION

This invention relates to current limiting devices, and more particularly relates to a fault current limiter for electric power systems. By electric power systems is meant power transmission and power distribution systems operating at from 50 to 60 hertz, and having voltage ratings in excess of about 10,000 volts and current ratings in excess of about 500 amperes. However, the concepts of the invention are also applicable to lower voltage systems.

As the power of electric power transmission and distribution systems increases, the problems of system stability during fault and the extent of possible fault damage also increases. The consequent increase in required circuit breaker performance and in performance of other equipment in handling high fault levels in such systems has substantially increased the cost of the breakers and associated equipment. Thus, devices which are capable of inserting a current limiting impedance into the power circuit, with the initiation of a fault condition in the circuit, are increasingly desirable since they allow the use of equipment such as breakers and the like which need not be capable of withstanding the available short circuit capacity of the system (short-circuit currents which could be reached in the absence of the current limiting impedance).

Fault current limiting devices have been employed in the past which consist of fan inductance-capacitance series circuit which is resonant at the power line frequency. Under a fault condition, and at a selected instantaneous current (and a selected instantaneous voltage across the capacitor) a saturable reactor or high impedance in parallel with the capacitor saturates or switches to a relatively low impedance to shunt the capacitance. The inductor is then left in the circuit to provide an additional current limiting inductance in series with the source.

In the above prior art system, the series capacitor is physically large and is very expensive. Moreover, series capacitors in electric power systems are not reliable and are not desired by power utilities.

BRIEF DESCRIPTION OF THE INVENTION

In accordance with the present invention, a fault current limiter is formed of a parallel-connected capacitor and inductor which are in series with the power line, but are normally short circuited by a normally closed parallel-connected switching device. The switching device is operated to an open position when the power line fault current reaches a given value. Preferably, the switching device is self-operated at the given fault current, as by employing a blow-open configuration for the switch contact current path with the contacts held closed againt the blow-open force by a given spring closing force.

Other switch arrangements can be used in accordance with the broad concept of the present invention.

In each case, fault current sensing switch operation and cut-in of the high impedance element must take place in a time period of the order of 2 milliseconds in order that the first crest of a-c current may be limited in magnitude. This action could be obtained by using a current tranformer to monitor current level; solid state circuitry to process the output of the current transformers and to deliver an output for initiating the opening of the switch means; an electrodynamic type drive circuit to deliver interrupter opening energy; and a mechanical switch operable by the electrodynamic drive to open the normal current path and develop a high enough arc voltage drop to effect commutation of the current into the current limiting impedance.

The parallel capacitor of the novel circuit serves two purposes. First, it facilitates commutation of the current from the normal current path through the switch contacts and into the inductor when the switch contacts open. Secondly, the capacitor serves as a transient voltage damping means across the inductor upon the interruption of the fault current by the system circuit breaker. It is also necessary that the capacitor is sized to avoid parallel resonance with the inductor at power system frequency. Thus, the capacitive reactance of the capacitor should be equal to or greater than about 10 times the inductive reactance of the inductor at power system frequency.

The novel fault current limiter of the invention has the advantages of low cost and reliability, as compared to prior art systems. The device has the same size as would be required by the series reactor alone since, as will be seen, the various components can be mounted within the volume defined by the inductor coil. The device is also simple and requires no auxiliary power for its operation. The unit is thus self-contained and may be self-operating and all equipment can be mounted at line potential.

BRIEF DESCRIPTION OF THE DRAWINGS

FIG. 1 is a circuit diagram of a parallel-connected capacitor and inductor and switch constructed in accordance with the invention.

FIG. 2 is an end view of the fault current interrupter constructed in accordance with the invention.

FIG. 3 is a cross-sectional view of FIG. 2 taken across section line 3—3 in FIG. 2.

FIG. 4 is an end view of a first embodiment of an interrupter switch of the invention in which the contacts are butt contacts formed on confronting pistons.

FIG. 5 is a cross-sectional view of FIG. 4 taken across the section line 5—5 in FIG. 4.

FIG. 10 is an end view of a further two-break embodiment of the interrupter switch of the invention.

FIG. 11 is a cross-sectional view of FIG. 10 taken across section line 11—11 in FIG. 10.

DETAILED DESCRIPTION OF THE DRAWINGS

Figure 7:
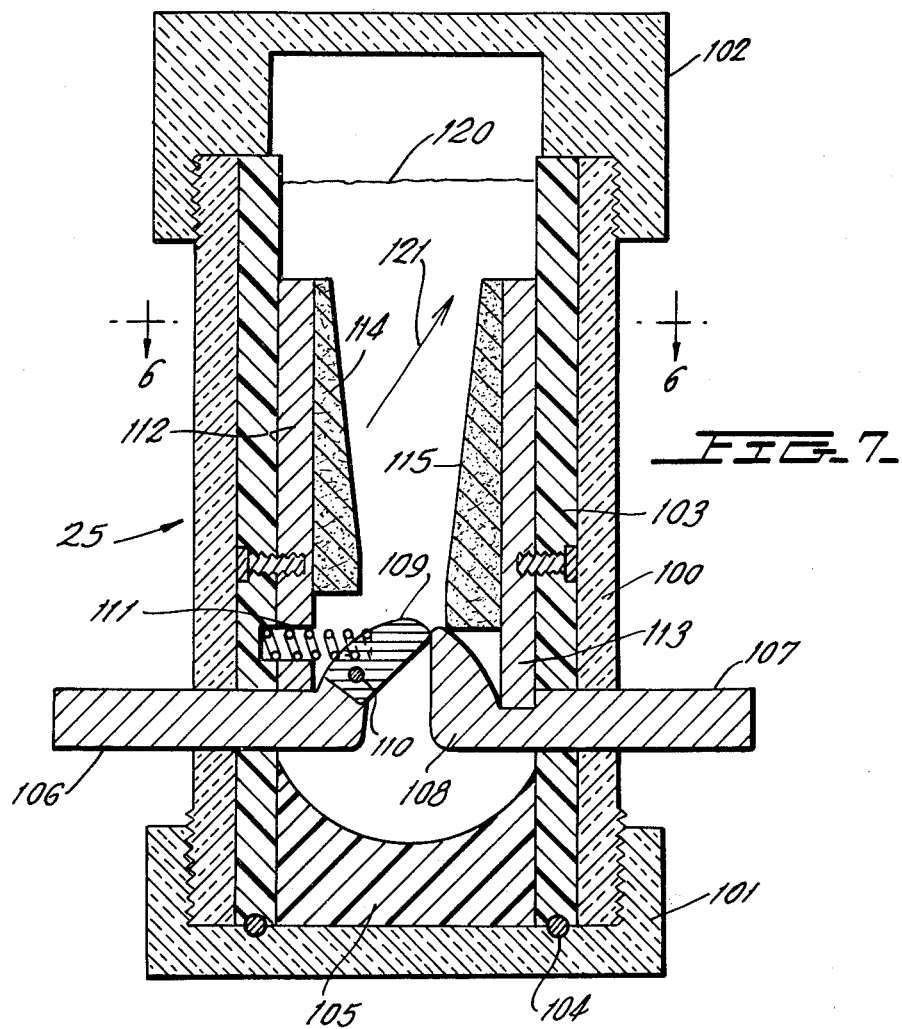
FIG. 7 is a cross-sectional view of FIG. 6 taken across section line 7—7 in FIG. 6.

Referring first to FIG. 1, the novel invention is shown in diagram fashion and contains terminals 21 and 22 which are connected in series with a conventional power circuit breaker 20 and a conventional electric power transmission circuit. The fault current limiter, in accordance with one aspect of the invention, consists of parallel-connected inductor 23, capacitor 24 and switch device 25.

Switch device 25 will be described later in connection with FIGS. 3 to 11 and operates normally to short-circuit inductor 23 and capacitor 24. Thus, the switching device 25 has a schematically illustrated movable contact member 26 which engages fixed contact 27 under normal circuit conditions. When a fault current flows in the circuit being protected and as will be later described, the contact arm 26 moves toward contact 28 and an arc current flows from contact 27, through arc-current-limiting impedances 29 and 30 (which are connected to one another through the arc) and to movable contact member 26. The arc voltage which appears across contacts 26 and 27 causes current from the main circuit to commutate into capacitor 24 which initially acts as a low impedance to current change and thence into inductor 23, which will then exert a current limiting action on the main circuit current. The main current is ultimately interrupted by the relatively slow main circuit breaker 20.

In one embodiment of the invention, the inductor 23 is an air core inductor having an inductive reactance at 60 hertz of the order of 1 ohm. The capacitor 24 facilitates the commutation of current into the inductor 23 and also serves as a transient voltage damper in the system. Preferably, the capacitor 24 will have a capacitive reactance of 10 ohms or more at 60 hertz.

FIGS. 2 and 3 show one embodiment of the fault current limiter of FIG. 1. The terminals 21 and 22 may have any configuration to allow easy connection of the component into an existing power system. The device of FIGS. 2 and 3 is contained within a weatherproof glass filament-wound and epoxy impregnated cylindrical housing 40 which has molded or cast insulation end closures 41 and 42 sealed thereto. The inductor 23 is then wound on an insulation cylinder or bobbin 43 which is suitably fixed within housing 40. The end terminals 45 and 46 are then suitably connected to terminals 21 and 22. A plurality of parallel-connected capacitors, including capacitors 48 and 49, are also connected by their leads 50–51 and 52–53 respectively to terminals 21 and 22 as shown. Capacitors 48 and 49 in FIG. 3 constitute the capacitor 24 of FIG. 1.

Switching device 25 is then connected as shown between terminals 21 and 22 and in parallel with inductor coil 23 and capacitors 48 and 49. The interior of tube 40 may then be filled with air, or may be filled with a gas such as sulfur hexafluoride, if desired, to improve the insulation of the inductor 23, switch 25 and capacitors 48 and 49. Mounting legs 55 and 56 may be provided to allow the easy mounting of the device in the power system.

FIGS. 4 and 5 show a first embodiment of the self-operating switch 25 of FIGS. 1 and 3. Switch 25 has terminals 60 and 61 which are connected to or might be terminals 21 and 22, respectively, in FIG. 3. The terminals 60 and 61 are in turn connected to conductive end caps 62 and 63, respectively, which are threaded onto the opposite ends of insulation tube 64.

Terminal 61 has an elongated thread which enters threaded opening 65 in end cap 63 and has an enlarged head 66 which threadably receives conductive cylinder 67. A nut 68 secures terminal 61 and its head 66 to the cap 63 and the entire terminal 61 can be secured in a higher or lower position for spring load adjustment, as will be later described. An O-ring seal 69 seals the outer surface of cylinder 67 to the inner surface of tube 64.

Cylinder 67, which is fixed in position, has a plurality of openings in its top, including openings 70 and 71, and has a butt-contact member 72 secured to and extending from its axial center as shown in FIG. 5. Contact member 72 cooperates with butt contact 75 which is carried on conductive movable piston 76. Piston 76 is axially movable along its axis and along the axis of tube 64. A compressed spring 77 biases piston 76 downwardly to press contact 72 and 75 toward engagement with one another with a given force. A conductive ring 78 is electrically and mechanically secured to cap 62, and a conductive and flexible shunt, schematically shown as shunt elements 79 and 80, electrically connect piston 76 to ring 78 and thus to cap 62 and terminal 60.

The cap 62 has an opening 81 therein and a conductive tube 82 is secured to cap 62. The tube 82 is then filled with brass or copper screening 90 and is capped with a conductive end cap 91 which is threaded onto the threaded end of tube 82. Cap 91 has a central plug 92 therein which permits easy access through the cap 91 to the interior of tube 82. The tube 82 serves both as a terminal conductor and as a filling spout for filling the interior of insulation tube 64 with liquid $SF_6$ to the level indicated in FIG. 5. The system is then charged with $SF_6$ gas at a pressure of about 300 p.s.i.g. The liquid sulfur hexafluoride then operates in such a manner as to generate $SF_6$ gas at higher pressure when a high voltage arc is drawn between contacts 72 and 75. Note that $SF_6$ liquid and charging $SF_6$ gas could be replaced by other liquids and gases, and by combinations of diverse liquids and gases so long as the liquid is one which will produce a high arc voltage. The tube 82 and the portion of ring 78 above the liquid level serves as an expansion space for expanding gas developed during arcing, while screening 90 serves as a cooling means to rapidly cool and recondense $SF_6$ gas generated by the liquid during arcing.

The operation of the interrupter of FIGS. 4 and 5 is as follows:

A normal current path is established through the normally closed butt contacts 72–75 which extends from terminal 61, head member 66, cyliner 67, butt contact 72, butt contact 75, movable piston 76, shunt members 79 and 80, conductive ring 78, cap 62 and tube portion 82 of terminal 60. It will be noted that the current flow through piston 76 and then into butt contact 72 makes an approximately 90° turn as it comes from the upper surface of piston 76 into butt contact 72. Similarly, current through butt contact 75 makes an approximate right-angle turn when flowing through the lower surface of piston 76 and then outwardly and up the piston walls. These turns then define a blow-off path in which magnetic forces tend to move contacts 72 and 75 away from one another. Thus, when the current becomes sufficiently high, the blow-off force becomes sufficient to move piston 76 upwardly toward a stop position against the bottom of ring 78 and against the downward biasing force of compression spring 77. The piston 76 further serves as a dashpot to delay the reclosing of contacts 72 and 75 when the blow-open force decreases.

The point at which contact separation between contacts 72 and 75 takes place can be controlled by adjusting the compression of spring 77 through the adjustment of conductive member 61 and after loosening the nut 68. Once the contacts separate because of the given instantaneous current flowing in the blowoff path, an arch will be drawn between contacts 72 and 75 which can heat the liquid $SF_6$ sufficiently high to produce sulfur hexafluoride gas. This gas bubble of expanding hot gas will provide a pressure level for expelling piston 76 away from piston 67, further lengthening the arc, and developing high arc voltage. Note that the arc voltage will cause current to commutate into the parallel capacitor and thence into the current limiting inductance 23 so that the network fault current will be limited in magnitude. The current is ultimately interrupted by the conventional circuit breaker 20 which responds relatively slowly to the appearance of the fault current in the circuit.

Once the fault current is extinguished by the circuit breaker 20, the butt contacts 72 and 75 of FIG. 5 are reclosed under the influence of spring 77. Both cylinder 67 and piston 76 in FIG. 5 have openings such as openings 70 and 71 to permit the flow of fluid and of gas therethrough, while the openings in piston 76 control its dashpot character.

The petcock 92 in FIG. 5 provides means for filling the interior of tube 64 with $SF_6$ liquid and the copper or bronze screen 90 serves as an effective cooling chamber for recondensation of gaseous $SF_6$ into liquid.

Figure 6:
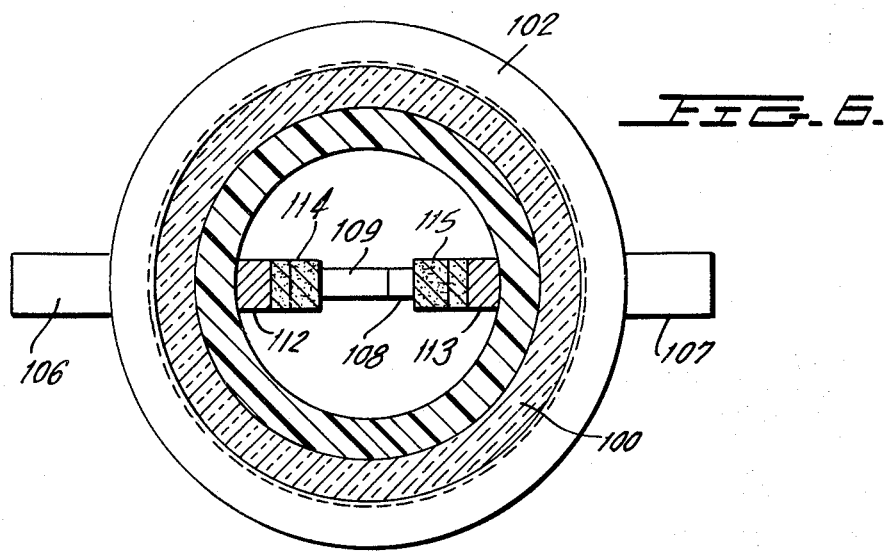
FIG. 6 is a cross-sectional view of a single break interrupter switch made in accordance with the invention and is a cross-sectional view of FIG. 7 taken across the section line 6—6 in FIG. 7.

FIGS. 6 and 7 show a second embodiment of the self-switching device of the invention. Referring to these figures, the self-switching device 25 (FIG. 1) consists of a glass-epoxy reinforcing tube 100 which has a bottom closure 101 and a top closure 102 threadably secured to its upper and lower ends. A molded epoxy housing 103 is then positioned within tube 100 and is sealed at its bottom to the bottom cap 101 by the seal ring 104. A catch basin 105, which serves to trap solid arc products, is also positioned at the bottom of housing 103.

The conductive terminals of the device consist of terminals 106 and 107 which correspond to terminals 21 and 22, respectively, in FIG. 3. Terminal 107 has an upwardly extending contact end 108 which is fixed in position while terminal 106 has a rotatable contact member 109 pivotally connected thereto on the fixed pivot 110. Pivot 110 can be current carrying but, preferably, flexible conductive shunts (not shown) carry current around pivot 110.

A biasing spring 111 is then secured within housing 103 and presses against contact finger 109 so that the contact finger 109 is normally pressed into engagement with fixed contact member 108. Damping means may also be connected to the spring 111 to delay reclosing of the contact 109 after it opens. A conductive arc runner 112 is physically connected to terminal 106 and thus to movable contact 109 while a second arc runner 113 is connected to stationary contact 108 and terminal 107. Each of arc runners 112 and 113 are further coated with appropriate carbon or out-gassed activated carbon arc runners 114 and 115, where these arc runners 114 and 115 may be of either linear or nonlinear resistive material.

The container or outer tube 100 is then filled with liquid $SF_6$ to the level indicated by line 120. The entire switching device may then be oriented such that the magnetic field of reactor coil 23 in FIG. 3 will take the direction of arrow 121 in FIG. 7 to increase the blow-off force on the arc between runners 114 and 115.

The device of FIGS. 6 and 7 operates in the following manner:

The current path through the device makes a U-shaped bend when going from terminal 106 into movable contact 109 and then down through contact 108 and out the terminal 107. This U-shaped path then develops a blow-off force which tends to rotate rotatable contact 109 in a counterclockwise direction. This rotation, however, is opposed by the biasing force of spring 111. However, once the instantaneous current magnitude through the device is sufficiently high, the contact 109 will rotate counterclockwise against spring 111, and an arc will be drawn between the separating contacts 109 and 108. Upon establishment of the arc, a high pressure gas bubble forms between the faces of contacts 108 and 109, providing further opening force to contact 109. This arc will be transferred to the arc runners 114 and 115 in the conventional fashion and, as the arc progresses upwardly along the runners, increased resistance is inserted in the arcing circuit, thereby to increase the voltage between terminals 106 and 107. If desired, a nonlinear resistance material can be used for the arc runners 114 and 115, such as pure iron or pure tungsten, or the like, which exhibits a dramatic increase of resistivity with heating due to the arc current.

It is to be noted that a suitable retarding force (not shown) should be applied to the contact 109 to prevent it from reclosing once the arc current is transferred to the arc runners 114 and 115. To this end, a suitable dashpot or the like can be connected to contact 109 so that it recloses only after the main circuit has been cleared of the fault current. This can be accomplished by a relatively small damping bellows or the like since the delay time needed is extremely short, for example 30–50 milliseconds. Note further that the dielectric medium liquid level 120 is above the level of the arc runners 114 and 115.

If desired, arc splitter plates may extend downwardly from closure 102 and between the arc runners 114 and 115 to ensure further elongation of the arc as it traverses upwardly between the runners 114 and 115.

Figure 9:
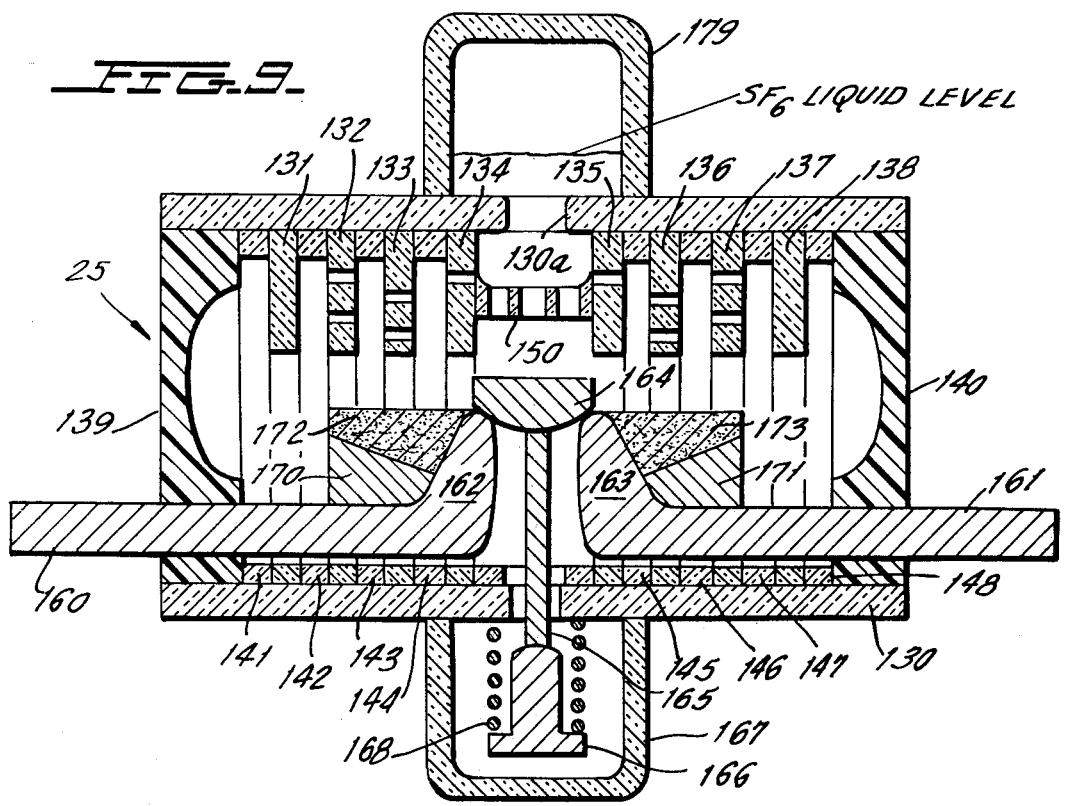
FIG. 9 is a cross-sectional view of FIG. 8 taken across section line 9—9 in FIG. 8.
Figure 8:
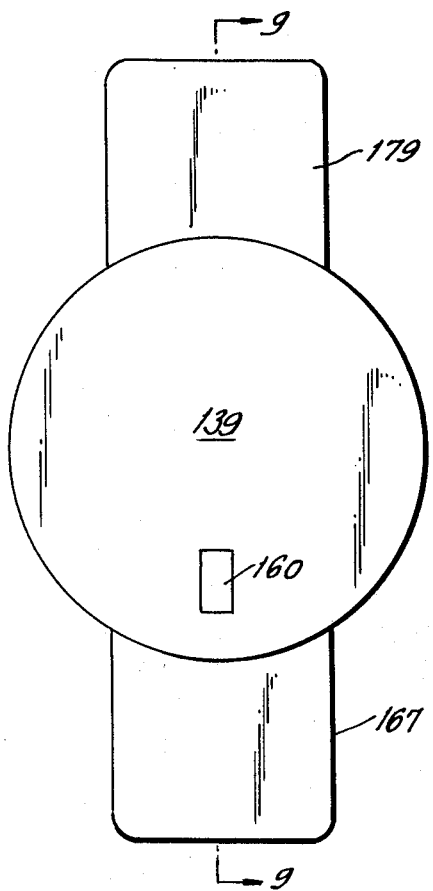
FIG. 8 is an end view of a double break interrupter switch made in accordance with the invention.

FIGS. 8 and 9 show a still further embodiment of the self-switching fault current limiter switch of the invention which uses a double break configuration. The device of FIGS. 8 and 9 consists of a tubular housing 130 which contains a stack of insulation plates shown as plates 131 to 138 which are spaced from one another and from end plugs 139 and 140 by spacer rings 141 to 148. Each of the plates 131 to 138 are contoured to define completely cutaway side sections which are aligned with one another along with increased radial thickness sections which are also aligned with one another above the center line of tube 130 in FIG. 9. The central plates 134 and 135 may be joined at a portion of their opposing surfaces by a bridging section 150, whereby the various plates define staggered and tortuous flow channels through the plates for gas which is produced upon the operation of the contacts as will be later described.

The device terminals 160 and 161 enter through end plugs 139 and 140, respectively, and terminate with upraised fixed contact portions 162 and 163, respectively. The bridging contact 164, which is carried on operating rod 165, is then movable into and out of engagement with stationary contact ends 162 and 163.

The operating rod 165 extends downwardly into a damping assembly 166 carried within cup 167. A biasing spring 168 then presses the damping assembly piston 166 downwardly, thereby to bias movable bridging contact 164 into engagement with contacts 162 and 163. The contacts 162 and 163 are then provided with conductive arc runners 170 and 171, respectively, which have carbon arc runner material on their upper surfaces to define carbon arc runners 172 and 173, respectively. The entire tube 130 is then filled with liquid $SF_6$ to the level indicated in the upper cup 179 in FIG. 9 which communicates with the interior of tube 130 through opening 130a.

In operation, the current through the device 25 of FIG. 9 travels a U-shaped path in going from stationary contact 162 through the bridging contact 164 and into the stationary contact 163. Thus, a blow-off path is defined, such that when the current magnitude in the path is sufficiently high, say two to three orders of magnitude greater than rated current, the blow-off force exceeds the biasing force of spring 168 so that contact 164 moves upwardly and an arc is drawn to the stationary contacts 162 and 163.

Note that the contact 164 will tend to remain open for a time depending upon the damping action provided by damping piston 166 after the opening force diminishes or disappears. Note further that the contact 164 can be flexibly connected to the operating rod 165 to ensure good contact engagement with the stationary contacts 162 and 163.

The arc plates or arc splitters 131 to 138 and the bridging section 150 are selectively provided with openings therethrough to permit the flow of gas produced from sulfur hexafluoride liquid into the expansion region above the $SF_6$ liquid level in cup 179. Thus, during operation, when the current between terminals 160 and 161 becomes sufficiently high, contact 164 moves upwardly and arcs are drawn from contact 164 to stationary contacts 162 and 163. These arcs then transfer to the arc runners 172 and 173, respectively, and run outwardly along arc runners 172 and 173, thereby to be elongated and cooled by the arc splitters. Note that the arc splitters 131 to 138 can be formed of a suitable ceramic or carbon composition of any desired type. The arc voltages produced are then relatively high and cause commutation of current into the inductor coil 23 in FIGS. 1 and 3. Thus, the main current fault is limited in magnitude until the circuit breaker 20 is operated. Note that the damping applied to the contact 164 is such that the contact does not reclose on the contacts 162 and 163 until after the main current is cleared by circuit breaker 20 (FIG. 1).

FIGS. 10 and 11 show a still further embodiment of the invention with a double break arrangement. Thus, in FIG. 11 a glass epoxy tube 180, having a top closure 181 and a molded epoxy bottom insert cup 182, receives two extending terminals 183 and 184 which correspond to terminals 21 and 22, respectively, in FIG. 3. Each of terminals 183 and 184 terminate in stationary contacts 185 and 186, respectively, which are bridged by a movable bridging contact 187. The movable bridging contact 187 is then carried in a slot 188 in insulation rod 189 and a leaf spring 190 presses contact 187 downwardly in slot 188. The rod 189 then has a piston-shaped end 191 which is received in a cup 192 which is secured to the bottom of insulation cup 182.

A compression spring 192a then biases the rod 189 downwardly, thereby to cause the bridging contact 187 to engage stationary contacts 185 and 186 with a given contact pressure. Note that piston 191 serves the function of a damping assembly to delay the reclosing of contact 187 after the contact is opened.

Each of terminals 183 and 184 are then provided with respective arc runners 193 and 194 which extend upwardly and which extend on either side of a central arc runner 195. The central arc runner 195 is supported by a threadably adjustable support rod 196 which is carried in the closure 181 so that the height of the central arc runner 195 can be adjusted without opening closure 181.

In operation, the current flow through terminals 183 and 184 takes a U-shaped bend through bridging contact 187. Thus, a blow-off force is applied to the contact 187 which is opposed by the biasing force of spring 192a. Once this biasing force is exceeded, however, contact 187 moves upwardly and the entire rod 189 will move upwardly with the contact 187 and arcs are drawn from contacts 185 and 186 to the movable contact 187. These arcs will then be transferred in the usual manner to arc runners 193 and 194 and the arc ultimately, as it expands upwardly, will move off contact 187 and seat on either side of arc runner 195.

Two arcs will then continue to move upwardly, one extending from runner 193 to runner 195 and the other extending from runner 195 to runner 194. A relatively high voltage drop then appears across terminals 183 and 184, thereby to cause current flow into the current limitng inductance 23 of FIGS. 1 and 3.

Although this invention has been described with respect to preferred embodiments, it should be understood that many variations and modifications will now be obvious to those skilled in the art, and it is preferred, therefore, that the scope of the invention be limited, not by the specific disclosure herein, but only by the appended claims.

The embodiments of the invention in which an exclusive privilege or property is claimed are defined as follows:

1. A fault current limiter for connection in an electric power circuit, and in series with a circuit breaker in said electric power circuit; said fault current limiter comprising an inductor, a capacitor, and a switching device; said switching device having interrupting capability; said inductor, capacitor and switching device being connected in parallel with one another; said switching device being operable between an open circuit condition and a closed circuit condition; operating means associated with said switching device and coupled to the current in said electric power circuit for maintaining said switching device in its said closed circuit condition when a circuit parameter in said electric power circuit is at or below a given value, and for operating said switching device to its said open circuit condition when said circuit parameter exceeds said given value; said electric power circuit having a given frequency; said capacitor and said inductor being resonant at a frequency substantially higher than said given frequency; said electric power circuit frequency being from 50 to 60 hertz; said capacitor having a capacitive reactance of about 10 times or more than the inductive reactance of said inductor.

2. The fault current limiter of claim 1 wherein said circuit parameter is current, and wherein said given value for said circuit parameter is a current magnitude which is above the rated current of said electric power circuit.

3. The fault current limiter of claim 2 wherein said switching device includes a pair of cooperable contacts movable between an open position and a closed position to define said open and closed circuit conditions respectively, and biasing means for biasing said pair of cooperable contacts to an engaged position.

4. The fault current limiter of claim 3 wherein said inductor comprises an air core winding; a hollow cylindrical housing; said air core winding being supported within the body of said hollow cylindrical housing; said capacitor and said switching device being contained within said housing; said housing being sealed and filled with a dielectric gas.

5. The fault current limiter of claim 3 wherein the current path through said pair of cooperable contacts defines a blow-off path whereby said pair of cooperable contacts are moved to a disengaged position against the force of said biasing means when the current through said contacts exceeds said given value; and delay means connected to said contacts for delaying the reclosing of said contacts for a given time following their opening.

6. The fault current limiter of claim 1 wherein said switching device includes a pair of cooperable contacts movable between an open position and a closed position to define said open and closed circuit conditions respectively; and biasing means for biasing said pair of cooperable contacts to an engaged position.

7. A fault current limiter for connection in an electric power circuit, and in series with a circuit breaker in said electric power circuit; said fault current limiter comprising an inductor, a capacitor, and a switching device; said inductor, capacitor and switching device being connected in parallel with one another; said switching device being operable between an open circuit condition and a closed circuit condition; operation means associated with said switching device and coupled to the current in said electric power circuit for maintaining said switching device in its said closed circuit condition when a circuit parameter in said electric power circuit is at or below a given value, and for operating said switching device to its said open circuit condition when said circuit parameter exceeds said given value; said electric power circuit having a given frequency; said capacitor and said inductor being resonant at a frequency substantially higher than said given frequency; said inductor comprising an air core winding; a hollow cylindrical housing; said air core winding being supported within the body of said hollow cylindrical housing; said capacitor and said switching device being contained within said housing; said housing being sealed and filled with a dielectric gas.

* * * * *